United States Patent [19]

Becker

[11] Patent Number: 5,279,806
[45] Date of Patent: Jan. 18, 1994

[54] PROCESS FOR ELIMINATING HEAVY METALS FROM PHOSPHORIC ACID

[75] Inventor: Pierre Becker, Chatou, France

[73] Assignee: Office Togolais des Phosphates, Kpeme-Togo, Togo

[21] Appl. No.: 793,369

[22] PCT Filed: Jul. 4, 1990

[86] PCT No.: PCT/FR90/00507

§ 371 Date: Jan. 6, 1992

§ 102(e) Date: Jan. 6, 1992

[87] PCT Pub. No.: WO91/00244

PCT Pub. Date: Jan. 10, 1991

[30] Foreign Application Priority Data

Jul. 4, 1989 [FR] France ............... 89 08979

[51] Int. Cl.$^5$ ............................................. C01B 25/16
[52] U.S. Cl. ........................... 423/321.1; 423/306
[58] Field of Search .............. 423/321, 423/308, 309; 423, 306

[56] References Cited

U.S. PATENT DOCUMENTS

| | | | |
|---|---|---|---|
| 4,457,848 | 7/1984 | Shimmel et al. | 423/321 R |
| 4,822,582 | 4/1989 | Weterings et al. | 423/321 R |
| 4,986,970 | 1/1991 | Haraldsen | 423/321 R |

FOREIGN PATENT DOCUMENTS

| | | | |
|---|---|---|---|
| 0087065 | 8/1983 | European Pat. Off. | 423/321 R |
| 0253454 | 1/1988 | | |
| 123006 | 6/1987 | Japan | 423/321 R |

Primary Examiner—Wayne Langel
Attorney, Agent, or Firm—Wegner, Cantor, Mueller & Player

[57] ABSTRACT

Process for treating phosphoric acid for removing heavy metal cations, in particular cadmium, and sludges contained in the acid, characterized in that concentrated phosphoric acid having a low solids content is used and in that the calcium sulfate supersaturation of the phosphoric acid is controlled to form a compound of the formula I:

$$(SO_4)_{1-x}(PO_4)_x(H)_yCa_{1-\delta7}M;$$

where x is between $0.5 \times 10^{-2}$ and $1 \times 10^{-1}$; y is between 0 and $x+\delta$; $\delta$ indicates the chemical substitution of calcium by other metal cations; and M represents one or more metal cations contained in the initial phosphoric acid, whose total charge is approximately equal to $2\delta + x - y$.

The following "Brief Description of Drawings" has been inserted between lines 19 and 20 on page 4 of the specification to comply with 37 CRF 1.74 and MPEP 608.01(f).

The sole FIGURE of the Drawings is a flow diagram illustrating one embodiment of the process according to the present invention.

13 Claims, 1 Drawing Sheet

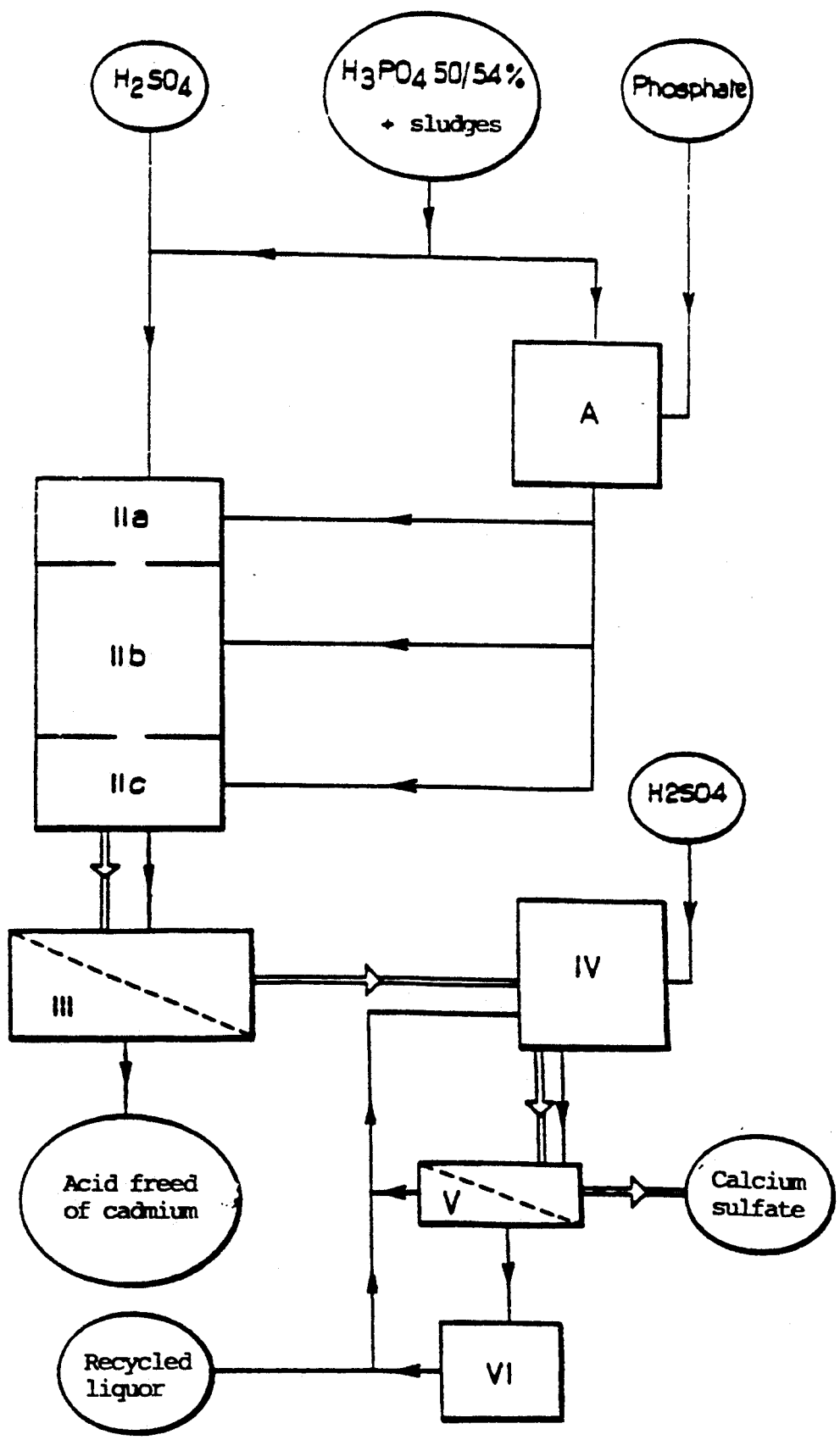

PROCESS FOR ELIMINATING HEAVY METALS FROM PHOSPHORIC ACID

The present invention relates to a process for the treatment of phosphoric acid. More particularly, it concerns a process for treating concentrated phosphoric acid to eliminate certain heavy metals and also fine sludges which accumulate therein.

Concentrated phosphoric acid is to be understood as an acid whose concentration, expressed as $P_2O_5$ (by weight) according to the usage in the phosphate industry, is between about 50 and about 60% (unless otherwise stated, the noughts are not considered to be significant figures). These values are approximate and depend especially on the process used for the conversion of phosphates into phosphoric acid. They also depend on the impurities which, like magnesium, can affect the viscosity.

The above contents are rounded up and relate, in particular, to acids which may be about 48%.

These acids, after having been formed by reaction, have been subjected to an evaporation in order to reach the above concentrations. In general, the $P_2O_5$ concentration is between 50 (two significant figures) and 57%. This phosphoric acid is generally low in dissolved calcium, but it can contain relatively large quantities of sulfuric acid. In general, these acids clarified before the concentration-evaporation stage are not treated immediately at the outlet from the evaporation and are in a state of disequilibrium of suspended and dissolved salts, which is sufficient for considerable quantities of calcium sulfate and other compounds to settle out in any storage locations, necessitating both major and costly treatment.

Among the large number of impurities present in phosphate minerals and especially in apatites, uranium and the rare earths, and also iron, aluminum and titanium may be mentioned. Numerous processes for the recovery of uranium and, in some cases, the rare earths have been proposed in the period when uranium prices were particularly high.

Among the numerous other elements present in the phosphate mineral and hence in the phosphoric acid, divalent metals (Sr, Ba) and more particularly cadmium may be mentioned.

While certain phosphate minerals are very low in cadmium (less than a few ppm), other minerals are fairly rich in this element and can sometimes reach values much higher than 100 ppm.

For environmental reasons, it is becoming less and less acceptable to use phosphate fertilizers which contain an element reputed as toxic, namely cadmium.

Numerous countries have issued, or are about to issue, regulations which limit the cadmium content of fertilizers.

This is the reason why it is important and even essential for the mining of deposits with cadmium-containing zones to be able to effect a removal of cadmium from their minerals or from the phosphoric acid obtained therefrom.

Numerous cadmium removal processes have been proposed such as, for example, solvent extraction, sulfide precipitations, removal by ion exchange, and electrolytic techniques. Nevertheless, the volumes of phosphoric acids to be treated are so great relative to the small cadmium content that most of the proposed processes, even though they are chemically efficient, represent a heavy economic burden.

More recently, a process proposed in European Patent Application No. 0,253,454 suggests precipitating the anhydrite and accomplishing by means of this anhydrite precipitation an entrainment of cadmium, thus allowing purification of the phosphoric acid.

Nevertheless, the cadmium contents of the anhydrite in this process are too small to allow a further treatment and lead to depositions of considerable quantities of anhydrite in controlled landfills, with a risk of pollution due to the cadmium content.

Moreover, the process as proposed does not appear to be applicable to highly concentrated phosphoric acids. In fact, this process, as described in general terms in the description and more precisely in the examples, aims essentially to precipitate anhydrite from phosphoric acid of medium concentration of, for example, 44% of $P_2O_5$ by adding an excess of sulfuric acid which causes the calcium sulfate to (re)crystallize, the latter effecting a slight entrainment of the cadmium contained in the phosphoric acid. It is also to be noted that the residual cadmium content remains relatively high if phosphoric acid alone is purified, rather than a mixture of phosphoric and nitric acids. As for the content in the wastes, this is sufficiently high to cause a pollution problem but too low for a further treatment of such considerable quantities, since the content of this element in the calcium sulfate wastes varies from 23 ppm (Example 4) to 400 ppm (Example 2).

In fact, his process can also displace the problem from the phosphoric acid to the storage of the calcium sulfate, where it is liable to be leached by various atmospheric waters. Moreover, the cost of such a process is high in terms of investment, both for the reason of the considerable quantities of calcium sulfate to be crystallized and the enormous retention time needed.

In fact, for a cadmium elimination process to be economically acceptable, it is desirable that it effects a further operation in addition to the actual elimination of cadmium, which operation may either be the recovery of other metals of high value or a treatment necessary in phosphoric acid production or very advantageous for the quality of the latter.

This is why one of the objects of the present invention is to provide an inexpensive process for treatments of phosphoric acid.

Another object of the present invention is to provide a process of the above type, which does not involve a large volume of wastes which have to be These objects and others which will appear below are achieved by means of a treatment process for phosphoric acid with the aim of removing heavy metal cations, in particular cadmium, and sludges contained in the acid, characterized in that concentrated phosphoric acid having a low solids content is used and in that the calcium sulfate supersaturation of the phosphoric acid is controlled to form, by precipitation, a compound of the formula (I):

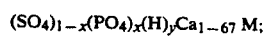

where
x is between $0.5 \times 10^{-2}$ and $1 \times 10^{-1}$, advantageously between $1 \times 10^{-2}$ and $0.5 \times 10^{-1}$,
y is between 0 and $x + \delta$, preferably between $x - \delta/2$ and $x + \delta/2$;

δ indicates the chemical substitution of calcium by other metal cations, and

M represents one or more metal cations contained in the initial phosphonic acid, whose total charge is approximately equal to $2\delta + x - y$.

The compound forms particularly readily with cations whose ionic radius differs by at most about $\frac{1}{5}$, advantageously $\frac{1}{7}$ and preferably 1/10 from that of the $Ca^{++}$, $Cd^{++}$, $Y^{3+}$ cations. This phenomenon is perfectly illustrated by a comparison of the precipitations of strontium and barium. This latter metal, whose ionic radius is higher than that of calcium by about $\frac{1}{5}$ (see Linus Pauling tables) is much less readily incorporated in the compound I than strontium, whose difference from calcium is only 25%.

In particular, M can be written in the form of $M_1 + M_2$, where $M_1$ is a metal cation with two charges and $M_2$ is a metal with three charges. M is preferably selected from divalent metals whose ionic radius is not very different from that of cadmium or calcium.

With respect to the metals $M_2$, their ionic radius must advantageously be close to that of trivalent yttrium or of divalent cadmium or calcium.

To obtain the compound of the formula I, it is important to control the calcium sulfate supersaturation in the phosphoric acid in such a way that a crystal cross rate results which promotes the existence of compound I.

This supersaturation is a determining factor for the kinetics of the crystallization of compound I. By means of routine experience, a person skilled in the art will be able to determine the supersaturation levels which lead to compounds of the formula I.

The supersaturation, to which reference is made above, can be controlled by techniques known to those skilled in the art, advantageously by techniques described below in the present document.

It should be noted that, and this is one of the essential teachings of the present invention, the more phosphate groups there are in the network (that is to say the higher x is), the better is the precipitation of the metal impurities symbolized by M, and particularly of cadmium. Nevertheless, a compromise must be found between the various constraints to which a phosphoric acid is subject in the course of processing, and especially to the economic constraints associated with the residence time in the various reactors.

A further aspect of the present invention is that the precipitation of a compound of type I allows a considerable reduction in the formation of sludges which would later precipitate in the concentrated acid.

These "sludges" which are in part formed during the wet-processing of phosphoric acid represent a disadvantage which is well known to phosphoric acid manufacturers. They consist of solid particles partially resulting from an inevitable passage across the meshes or across perforations of the filter cloths in acid production (20/30 and 40/45% $P_2O_5$ depending on the process) on the one hand, and partially from precipitates forming after the filtration of the acid, as a consequence of supersaturation due to a concentration by evaporation and further cooling of the acid during storage. state, since a part thereof arises from a medium which is thermodynamically different from the final medium, namely concentrated acid having a $P_2O_5$ content above 50%. The resulting instability leads to a recrystallization of these solids, frequently in undesired places and forms.

These precipitates form under extremely unfavorable conditions (very viscous medium with little agitation or none at all) and consequently show characteristics which make it very difficult to separate them from the phosphoric acid: poor filterability, difficult decantation, etc.).

These post-precipitations can go on over more than 40 days and frequently have a disadvantageous influence on the quality of the acid and create problems in transport and storage of said acid (cleaning of tankers with acid losses and marine pollution, blockage of piping, etc.). To give an idea of the magnitude of this phenomenon, it should be remembered that, in acid with about 30% of $P_2O_5$, the calcium sulfate dissolved in the phosphoric acid represents between about 3 and about 6% of $CaSO_4$ relative to the weight of phosphoric anhydride $P_2O_5$.

Considering a commercial acid, that is to say an acid having 50 to 54% of $P_2O_5$, the solubility of calcium sulfate expressed in the same way changes to a value between 0.4 and 0.9%, which means that a significant part of the calcium sulfate present in 30% phosphoric acid will precipitate after production, i.e. about 25 to 50 kg of solids per ton of $P_2O_5$.

In fact, the calcium sulfate is only a particular case of a more general phenomenon: other precipitations involving other metals such as potassium, magnesium, aluminum and iron, also take place, like those of alkali metal fluosilicates.

In a surprising manner, the process according to the present invention allows these delayed precipitations to be avoided at least partially, and phosphoric acid to be obtained which is substantially in equilibrium with these dissolved elements. In fact, the compound of the formula I allows, on the one hand, a quasi-total elimination of the calcium sulfate supersaturation from the product acid and, on the other hand, a removal of a significant part of metals dissolved in the medium.

The process according to the present invention thus allows, at one and the same time, a reduction of the quantity of heavy metals and especially cadmium in the medium in a very notable manner, while solving the sludge problem.

With respect to the value of delta, this value is extremely variable and depends essentially on the impurities present in the phosphoric acid. In a general way, the value of delta is not significantly higher than the value of x. The metals precipitated by this technique are essentially heavy metals such as cadmium and the other alkaline earth metals Ba and Sr, whose ionic radius is not very different from that of calcium; nevertheless, the presence of the phosphate or hydrogen phosphate grouping appears to facilitate the precipitation of metal ions of other valencies and especially of metals with an f shell, more particularly the lanthanides and rare earths (Y, La, etc.).

One of the parameters which is involved in the formation of the compound of the formula I is the phosphoric acid concentration. If this concentration is expressed as the proportion by weight of $P_2O_5$ relative to the phosphoric acid, the preferred zones are between 0.5 and 0.6, advantageously between 0.50 and 0.57, preferably between 51 and 55%. It should be noted that, for values in the vicinity of those obtained by the hemihydrate process without concentrating, that is to say between about 40 and 45%, the compound I is no longer obtained, whatever the influence of the other parameters. Only compounds having a structure distinct from that of compound I are obtained, as shown by the X-ray spectra.

One of the means for controlling the calcium sulfate supersaturation consists, on the one hand, of adjusting the sulfuric acid concentration to a value between about 1 and 7%, preferably between and 2 and 5%

The temperature is advantageously between 100° C. and the boiling point, preferably just below the boiling point, i.e. between about 110° C. and preferably between 1° and 5° C. below the boiling point; in general, the operation is carried out at around 120° C.

As already stated above, one of the important parameters is the kinetics of the formation of crystals in the precipitate, which kinetics depend on the supersaturation. According to the present invention, it is particularly advantageous to control the supersaturation by adjusting the calcium additions as defined above and controlling the supersaturation in such a way that the growth rate of the grains, under steady conditions, is between 10 and 100 micrometers, preferably between 15 and 30 micrometers/hour.

The addition should be carried out with controlled agitation, in order to ensure good diffusion of the reagent and to avoid an accumulation of precipitate at the point where the addition takes place. Advantageously, the agitation is effected under turbulent conditions with preferably an $N^3D^2$ coefficient of between 2 and 4 (N=speed in revolutions per second and D=diameter of the moving agitator in meters).

According to an advantageous embodiment of the present invention, the process comprises the following stages:

a) adjustment of the sulfuric acid content to the above values,
b) addition of calcium in a phospho-soluble form,
c) filtration of the precipitates obtained.

Advantageously, the stage b) is carried out in such a way that, afterwards, the sulfuric acid content is at most equal to 2 and preferably to 1% by weight. The stage b) is carried out, as indicated above, by addition of soluble calcium. This addition being carried out continuously or discontinuously in order to control the calcium sulfate supersaturation at the values specified above.

This is the reason why the process can comprise a supplementary stage f) of separating the said metals from the sulfo-phosphoric solution and recycling this diluted sulfo-phosphoric acid upstream of the phosphoric acid manufacturing process.

The technique of separating off the heavy metals depends on the nature of the metals trapped in the compound I and utilizes techniques known per se.

As an indicative example, precipitations by sulfides or hydrogen sulfide, or electrolysis can be used. Equally, it is possible to use ion exchange resins, such as sulfonic resins, amino-phosphonic resins or complexing resins, which can fix divalent or trivalent metals in a relatively acidic medium such as 1M sulfuric acid.

One embodiment according to the present invention is illustrated by the flow diagram constituting FIG. 1 (sic). In this flow diagram, where the liquid circulation is indicated by a single line and the solids circulation is indicated by double lines (the pulp being symbolized by a single line and double lines), the phosphoric acid is separated after filtration into two unequal fractions. The major fraction is directed towards the mixing point I, where an adjustment of the sulfuric acid content takes place. The phosphoric acid, whose sulfuric acid content has been adjusted, is introduced into a precipitation reactor II which can comprise a plurality of stages; in the flow diagram, three stages are shown, an initial cadmium precipitation stage IIa, a final cadmium precipitation stage IIb and an acid adjustment stage IIc.

The minor part of the phosphoric acid is directed towards a dissolution reactor A, where the calciferous material is mixed with and dissolved in the phosphoric acid.

The calciferous material is in general a phosphate mineral such as apatite, but this can equally also be other calcium phosphates or even soluble calcium salts such as calcium nitrate. The solution issuing from the reactor A is transferred to each of the stages directed towards the digester IV, while the phosphoric acid obtained after the separation of the solid materials is directed towards the storage for commercial use or transformation into various fertilizers.

The cake introduced into the digester IV is pulped and subjected to the action of a sulfuric acid of medium concentration, between about ½ and about 2M, the suspension is passed into a liquid/solid separation system where a cake consisting essentially of calcium sulfate, more or less hydrated, and a solution consisting of the sulfuric acid and phosphoric acid containing the metals trapped by the compound I is separated off. This solution is passed into a system VI which eliminates from it the major part of the heavy metals present, and the outflowing purified solution representing a purge will be recycled upstream of the phosphoric process, while the remaining flow will be directed to the recrystallization tank IV.

Thus, according to the present invention, it is possible on the one hand to obtain very efficient cadmium removal. This cadmium removal makes it possible to reduce the cadmium content of the phosphoric acid from about 50-100 ppm down to a value which can be less than 3 or even 1 ppm. In this way, the cadmium removal can be accomplished for any acid whatever its initial cadmium content. The effectiveness of the process depends on the rate of precipitation and hence on the recycling of the calciums sulfate supersaturation in the compartments of reactor II. It also depends on the number of stages for the precipitation of compound I. Finally, it depends on the quantity of sulfuric acid and calcium which are precipitated.

Even though this may be more expensive, it is possible to provide one or more liquid/solid separations between the various stages, permitting compounds I to be obtained which have different metal concentrations.

On the other hand, this process permits the problem of postprecipitation of calcium and sulfate to be solved.

Filterability of the slurry, including the countercurrent washes with water, requires only a relatively small device, since it allows 60 tonnes of $P_2O_5$ per square meter and per day to be treated, and this permits operation with small filters, provided that the flow controls between the compartments A and II are well-adjusted.

The postprecipitated quantities in the commercial acid freed of cadmium are less than 0.5%. The cadmium content is less than 3 ppm, which represents an elimination yield $(60-3)/60=0.95$. The sulfuric acid content is below 2%.

The recycled filter wash liquor corresponds to about 80 liters per tonne of $P_2O_5$ treated.

The solids separated off contain more than 95% of the cadmium initially present in the phosphoric acid. They contain about 5 to 10% of $P_2O_5$ depending on the degrees of cadmium removal and on the original sludges. The P₂O₅ is recovered in the course of the recrystallization or further digestion.

The final treatment comprises a recrystallization by digestion in an aqueous sulfuric acid medium in a compartmented tank IV forming the digestion IV, with preferably 3 compartments and controlled recycling. The volume of recrystallization slurry is controlled via its solids content and its degree of conversion. The volume of slurry corresponds to about about (sic) 100 liters per tonne of 54% phosphoric acid freed of cadmium, but depends on the solids content of the feed acid.

A small filter V, whose surface area is equivalent to about 0.1 m² per tonne of total P₂O₅ freed of cadmium, separates the retreated reject solids free of cadmium from their mother liquor which contains the cadmium and from which it will be precipitated in the form of cadmium sulfide and separated off by centrifuging. After the cadmium sulfide has been separated off, the mother liquor is recycled to the digestion and recrystallization stage IV. A purge, possibly mixed with the wash waters of the precipitated cake coming from reactor B, is recycled to a point upstream of the phosphoric acid production process and controls the content of P₂O₅ and of recovered metals other than those trapped by the compound I in the recrystallization mother liquor.

EXAMPLE 1

In a stirred reactor, 0.35 liter of phosphoric acid of 55% P₂O₅, 64 ppm of cadmium, 140 ppm of yttrium and 0.3% of "sludges" are heated to 120° C. and mixed with 40 grams of phosphate of 36% P₂O₅.

In a second stirred reactor, 1.00 liter of phosphoric acid of the same quality is likewise heated to 120° C., and 40 cm³ of sulfuric acid of 98% H₂SO₄ are added.

The liquid from the first reactor is added to the second one. A precipitate of 46 grams of crystals forms. The latter is filtered off and washed. The solid separated off contains 0.23% of cadmium and 0.41% of yttrium.

The acid freed of cadmium contains not more than 15 ppm of cadmium.

After 40 days, the amount of postprecipitated solids is less than 0.5%.

EXAMPLE 2

In a stirred reactor, 0.35 liter of phosphoric acid of 50% P₂O₅, 60 ppm of cadmium, 128 ppm of yttrium and 1.3% of "sludges" is heated to 120° C. and mixed with 80 grams of calcium phosphate of 36% P₂O₅.

In a second stirred reactor, 1.00 liter of phosphoric acid of the same quality is likewise heated to 120° C., and 45 cm³ of sulfuric acid of 98% H₂SO₄ are added.

The liquid from the first reactor is added to the second one. A precipitate of 109 grams of crystals forms. The latter is filtered off and washed. The solid separated off contains 0.12% of cadmium and 0.26% of yttrium.

The acid freed of cadmium contains at most 3 ppm of cadmium.

After 40 days, the amount of postprecipitated solids is less than 0.5%.

I claim:

1. Process for treating concentrated phosphoric acid to eliminate heavy metals contained therein, said phosphoric acid having a content expressed as the proportion by weight of P₂O₅ of between 50% and 60%, comprising the sequential steps of:
    a) adjusting the sulfuric acid content in the phosphoric acid to a value between 2 and 5% by weight,
    b) adding calcium to the phosphoric acid in the form of a monocalcic phosphate solution such that the sulfuric acid content is at most equal to 1% by weight, to form a precipitate of the formula:

$$(SO_4)_{1-x}(PO_4)_x(H)_y Ca_{1-\delta} M$$

where x is between $\frac{1}{2} \times 10^{-2}$ and $1 \times 10^{-1}$, y is between 0 and $x+\delta$, where $\delta$ indicates the substitution of calcium by other heavy metal cations, and where M represents one or more heavy metal cations, whose total charge is approximately equal to $2\delta + x - y$, said adding of calcium being such that the growth rate of the grains is between 10 and 100 micrometers per hour, and
    c) filtering the precipitate obtained, said process being carried out at a temperature between 100° C. and the boiling point.

2. The process of claim 1 wherein the heavy metal cation is at least cadmium.

3. The process of claim 1 wherein the phosphoric acid content expressed as the proportion by weight of P₂O₅ is between 50 and 57%.

4. The process of claim 1 wherein the variable x in the formula is between $1 \times 10^{-2}$ and $\frac{1}{2} \times 10^{-1}$.

5. The process of claim 1 wherein the variable y is between $x - \frac{1}{2}\delta$ and $x + \frac{1}{2}\delta$.

6. The process of claim 1 wherein said adding of calcium effects a growth rate of grains between 15 and 30 micrometers per hour.

7. The process according to claim 1 wherein the phosphoric acid content expressed as P₂O₅ is between 51 and 55% by weight.

8. The process according to claim 1 wherein the solids content of said phosphoric acid is less than or equal to 5% by weight.

9. The process according to claim 1 wherein the solids content of said phosphoric acid is less than or equal to 2% by weight.

10. The process according to claim 1 carried out at a temperature 1°-5° C. lower than the boiling point.

11. The process according to claim 1 further comprising the step of d) treating the filtered precipitate to remove the heavy metal.

12. The process of claim 11 wherein the step d) comprises digesting the filtered precipitate in 0.1-2M sulfuric acid to form a residual solution.

13. The process according to claim 12 wherein the step d) is carried out at a temperature of between 0° C. and 30° C.

* * * * *

UNITED STATES PATENT AND TRADEMARK OFFICE
CERTIFICATE OF CORRECTION

PATENT NO. : 5,279,806

DATED : January 18, 1994

INVENTOR(S) : Pierre BECKER

It is certified that error appears in the above-identified patent and that said Letters Patent is hereby corrected as shown below:

On the title page, item
[73] following "Assignee:", insert, part interest, after --Togo--.

Signed and Sealed this

Fourteenth Day of May, 1996

Attest:

BRUCE LEHMAN

Attesting Officer   Commissioner of Patents and Trademarks